Dec. 8, 1959   P. W. TICHLER   2,916,600
GAS SHIELDED METAL ARC WELDING
Filed June 18, 1957

INVENTOR.
PETER W. TICHLER
BY
Richard S. Shreve, Jr.
ATTORNEY

United States Patent Office 2,916,600
Patented Dec. 8, 1959

2,916,600

GAS SHIELDED METAL ARC WELDING

Peter W. Tichler, Nijmegen, Netherlands, assignor to Union Carbide Corporation, a corporation of New York Application June 18, 1957, Serial No. 666,316

6 Claims. (Cl. 219—74)

This invention relates to the welding of a joint automatically or by hand by applying one fusible electrode or two fusible electrodes simultaneously, the parts to be joined being positioned in an almost vertical plane and the joint to be welded being situated almost horizontally, whereas one part has been prepared with a rectangular edge and the other part has been bevelled on one or two sides. Such a joint, called a K-butt joint, has been so far welded by hand by applying a number of beads. When using this procedure the rectangularly prepared part was positioned below and the bevelled part was placed on top of it, whereas during the welding of the root-bead the electrode was pointed almost parallel to the bevelling of the upper part.

Such joints can also be welded automatically by the submerged-arc welding process. A machine-assembly for welding these joints has been described in the Dutch patent applications No. 173,245 and No. 179,492.

When using this submerged-arc welding process, only one bead is applied on either side. However, when applying the submerged-arc welding process, a difficulty arises, as the operator cannot observe the weld-puddle and consequently cannot take correcting measures during welding, resulting in the appearance of weld-defects only after the welding has been completed.

On the other hand it is known to weld a joint in an atmosphere of protecting gases with an automatically fed fusible electrode. This method has the advantages, that the penetration is far deeper and the deposition-rate is greater than obtained by electrode-welding. Due to the deeper penetration it is possible to decrease the angle of bevel thus decreasing the content of the weld-groove.

Hence, it is possible to increase the welding-speed and to accomplish the weld by applying only one bead on one or either side of the work piece, resulting in a considerable saving of time, as compared with electrode-welding.

As compared with the submerged-arc welding process, the penetration and the deposition-rate obtained by welding in a protecting gas atmosphere with a fusible electrode are almost the same, but it has the advantage that the operator can observe the weld-puddle during welding. Consequently the operator is able to take correcting measures with regard to the arc-length as well as the angle between the electrode and the work-piece.

When welding a K-butt joint with a fusible electrode in a protecting gas atmosphere according to current-practice, with the rectangular edge below and the bevelled edge on top of it, the penetration and fusion with the parent-metal appear to be extremely good, but heavy undercutting has occurred along the upper side of the weld.

Such undercutting is intolerable as it decreases the strength of the joint, so the undercutting must be removed by welding an additional bead by electrode-welding. This results in a loss of time and a raising of costs, thus nullifying partly the advantages of the welding with a fusible electrode in a protecting gas atmosphere. The invention aims at avoiding this difficulty. According to the invention the K-butt joint for welding with a fusible electrode in a protecting gas atmosphere is prepared in such a way, that the rectangular edge is placed above and the bevelled edge is placed below and the electrode is pointed slightly upwards.

The undercutting in welding K-butt joints, positioned almost horizontally in an almost vertical plane, the joint design being according to current-practice, with a fusible electrode in a protecting gas-atmosphere, is due to the blowing action of the arc, as the electrode is pointed slightly downwards as well combined with the downwards blowing action of the gas stream and the action of gravitation.

The objections mentioned above can be avoided by deviating from the current practice in welding almost horizontally joints in an almost vertical plane by placing the rectangular edge above and the bevelled edge below, and pointing the electrode slightly upwards. The same method can be applied when almost horizontal joints in almost vertical planes are bevelled on one side only.

The invention will be explained from the drawing, in which Fig. 1 is a schematic view of the position of the parts to be joined according to the current practice for welding K-butt joints, whereas in Fig. 2 a section of a weld obtained by electrode-welding is schematically shown.

Figure 5:
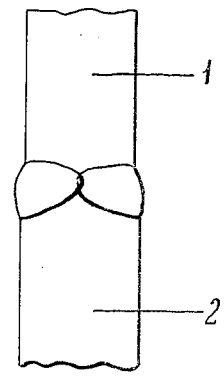

Fig. 5 gives a section of a welded joint, obtained by applying the method according to the invention.

The method used up to now for welding a K-butt joint will be explained briefly.

Figure 1:
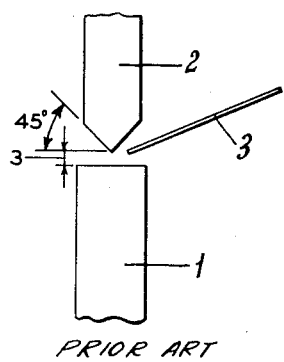
Figure 2:
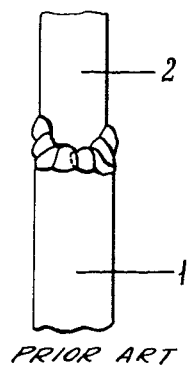

In Fig. 1 the two parts 1 and 2 to be joined are schematically sketched. The lower part 1 has been cut rectangularly along the edge, which adjoins the upper part 2, which has been bevelled on one or both sides. In the drawing the electrode 3 is indicated schematically, pointed downwards, almost parallel to the bevelling. The joint is welded by applying a number of beads, resulting in a completed weld as given schematically in Fig. 2.

When using the submerged-arc welding method, only one bead on each side is applied. If however, the welding is accomplished by the method with a fusible electrode in a protecting gas-atmosphere, using the weld-design and position of Fig. 1, the weld has a section, as indicated in Fig. 3.

Figure 3:
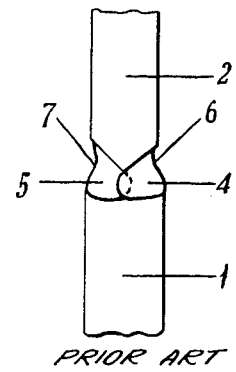
Fig. 3 shows a schematic section of a welded K-butt joint with the usual joint-design, however obtained by welding with a fusible electrode in a protecting gas-atmosphere.

Due to the deeper penetration and the larger melting-rate the advantage is obtained that the weld is accomplished in one bead on either side 4 and 5 respectively, but an intolerable undercutting occurs along the upper side of the weld, as indicated in Fig. 3 with 6 and 7.

Figure 4:
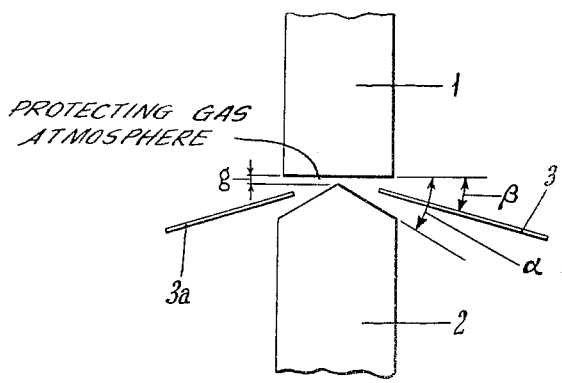
Fig. 4 shows schematically the erection of the parts to be joined and the electrode, used when applying the method according to the invention.

This undercutting can be avoided, according to the invention by using the joint-design as indicated by Fig. 4. In this drawing the rectangularly cut part 1 is positioned on top of the bevelled part 2. The electrode 3 is now pointed slightly upwards. The completed weld has now a section as indicated schematically in Fig. 5 and no undercutting has occurred.

The angle of bevelling $\alpha$ of the lower part 2 in Fig. 4 may amount from 15°–50°, whereas the root-gap $g$ may amount from 0–3 mm. (0–⅛″).

The angle $\beta$ between the electrode and the horizontal plane is preferably less than the angle of bevelling of the lower part; a favourable value of $\beta$ being $$\frac{\alpha}{2}$$

The welding with a fusible electrode in a protecting gas-atmosphere may be accomplished by hand or automatically. It is possible to use one single electrode 3, thereby welding first one side and then the other side, but two electrodes 3 and 3a may be used on either side as well, thus welding both sides simultaneously, thereby keeping some distance between both electrodes for reason of welding-technique.

What is claimed is:

1. Method for welding automatically or by hand of a joint, using a fusible electrode, the parts to be joined being positioned in a substantially vertical plane and the joint to be welded being situated substantially horizontally, one of the parts to be joined having a rectangularly cut abutting edge and the other one having a bevel on at least one side, characterized therein, that the rectangularly cut part is positioned on top of the bevelled part, the electrode being pointed slightly upwards and the welding being accomplished in a protecting gas-atmosphere.

2. Method according to claim 1, characterized therein, that the angle of the bevelling of the lower part amounts from 15° to 50°.

3. Method according to claim 1, characterized therein, that a root-gap exists between the parts to be joined, amounting to 0-3 mm. (0-⅛").

4. Method according to claim 1 characterized therein, that the angle between the electrode and the horizontal plane is less than the angle of bevelling of the lower part.

5. Method according to claim 1, characterized therein, that the angle of the electrode and the horizontal plane is half the angle of bevelling.

6. A welded joint, obtained by using a method according to claim 1.

References Cited in the file of this patent

UNITED STATES PATENTS

| | | |
|---|---|---|
| 1,688,980 | Miller | Oct. 23, 1928 |
| 2,348,728 | Crecca | May 16, 1944 |
| 2,642,965 | Danhier | June 23, 1953 |
| 2,667,559 | Arnold | Jan. 26, 1954 |

FOREIGN PATENTS

| | | |
|---|---|---|
| 527,107 | Great Britain | Oct. 2, 1940 |